United States Patent
Arthur et al.

(10) Patent No.: US 11,728,511 B2
(45) Date of Patent: Aug. 15, 2023

(54) UNIFORM ORGANIC-CERAMIC COMPOSITES INCLUDING A HARD-INORGANIC LITHIUM ION ELECTROLYTE AND A PLURALITY OF SOFT ELECTROLYTES, SOLID-STATE BATTERIES INCLUDING THE SAME, AND METHODS OF PREPARING THE SAME

(71) Applicant: Toyota Motor Engineering & Manufacturing North America, Inc., Plano, TX (US)

(72) Inventors: Timothy S. Arthur, Ann Arbor, MI (US); Nikhilendra Singh, Ann Arbor, MI (US); Rana Mohtadi, Northville, MI (US); Oscar Tutusaus, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 159 days.

(21) Appl. No.: 17/188,468

(22) Filed: Mar. 1, 2021

(65) Prior Publication Data
US 2022/0278361 A1  Sep. 1, 2022

(51) Int. Cl.
*H01M 10/0562* (2010.01)
*H01M 10/0525* (2010.01)
(Continued)

(52) U.S. Cl.
CPC ... *H01M 10/0562* (2013.01); *H01M 10/0525* (2013.01); *H01M 50/406* (2021.01); *H01M 50/449* (2021.01); *H01M 2300/0068* (2013.01)

(58) Field of Classification Search
CPC .......... H01M 10/0562; H01M 10/406; H01M 10/449; H01M 10/0525; H01M 50/406; H01M 50/449
(Continued)

(56) References Cited

U.S. PATENT DOCUMENTS

2017/0033352 A1*  2/2017  Mizutani .............. H01M 4/625
2017/0222258 A1*  8/2017  Kataoka ............ H01M 10/0525
(Continued)

FOREIGN PATENT DOCUMENTS

CN     102227034 A    10/2011
CN     107615551 A *  1/2018  ......... C08G 18/3234
(Continued)

*Primary Examiner* — Sean P Cullen
(74) *Attorney, Agent, or Firm* — Christopher G. Darrow; Darrow Mustafa PC

(57) ABSTRACT

A solid-state electrolyte for a lithium battery that includes a hard-inorganic electrolyte and at least two soft electrolytes (SEs), where the melting point of the solid-state electrolyte is less than the melting point of a highest melting SE included in the solid-state electrolyte. The SEs include ammonium or phosphonium salts of closo-borates and can include lithium closo-borates salts. The hard-inorganic electrolyte is a lithium thiophosphate (LPS), where the plurality of SEs is melt-diffused throughout the homogeneous combined hard-inorganic electrolyte and a plurality of SEs at a temperature below the highest melting point SE, generally below 100° C. The relative density of the solid-state electrolyte is greater than 90 percent.

17 Claims, 9 Drawing Sheets

(51) Int. Cl.
*H01M 50/406* (2021.01)
*H01M 50/449* (2021.01)

(58) Field of Classification Search
USPC .......................................... 429/322
See application file for complete search history.

(56) References Cited

U.S. PATENT DOCUMENTS

2020/0220222 A1     7/2020  Watarai et al.
2020/0381777 A1*   12/2020  Mohtadi ........... H01M 10/0562

FOREIGN PATENT DOCUMENTS

| CN | 112397762 A | * | 2/2021 | ......... H01M 10/052 |
| JP | 2020064832 A | * | 4/2020 | |
| KR | 2016014137 A | * | 2/2016 | ......... H01M 10/052 |

* cited by examiner

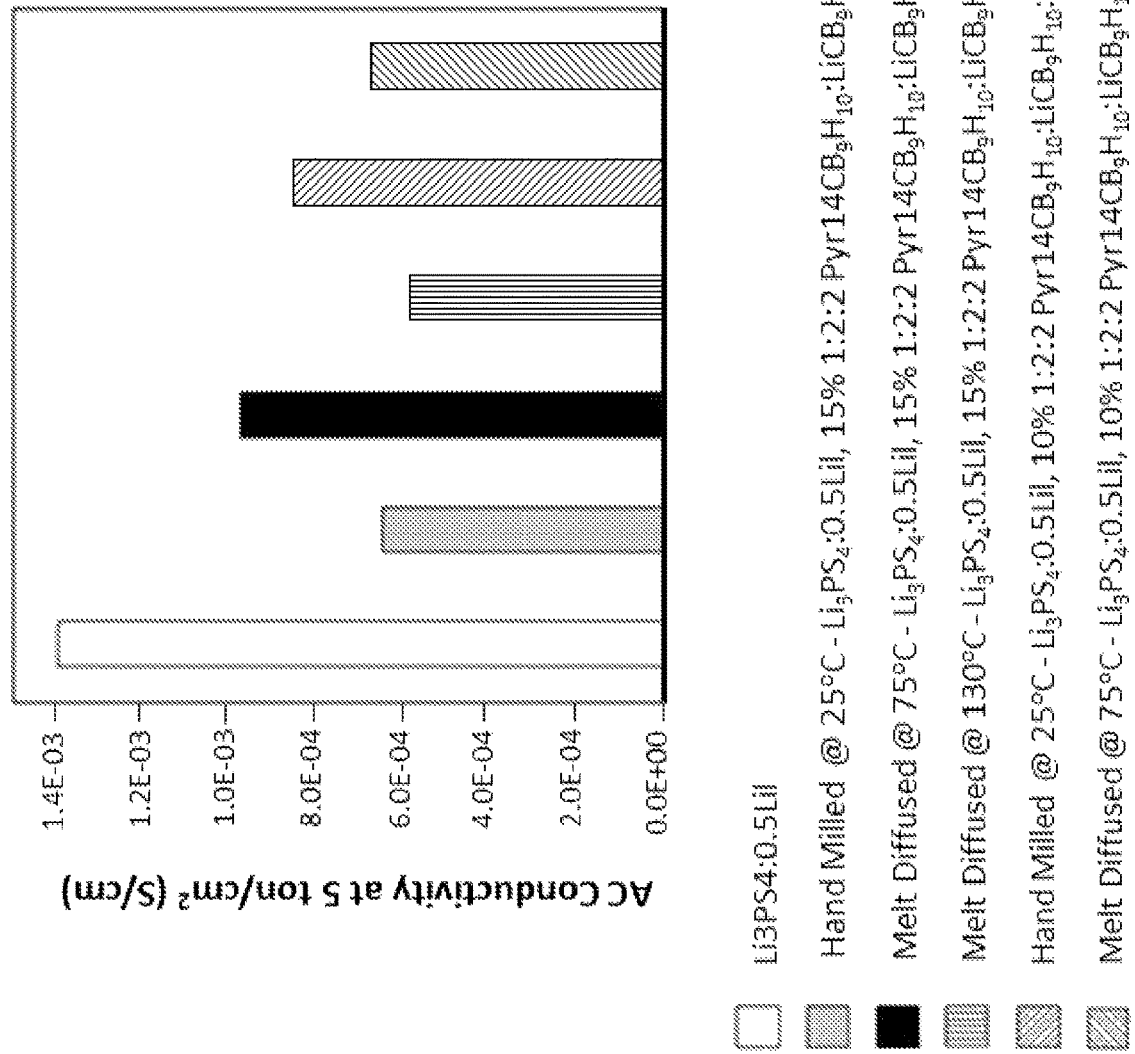

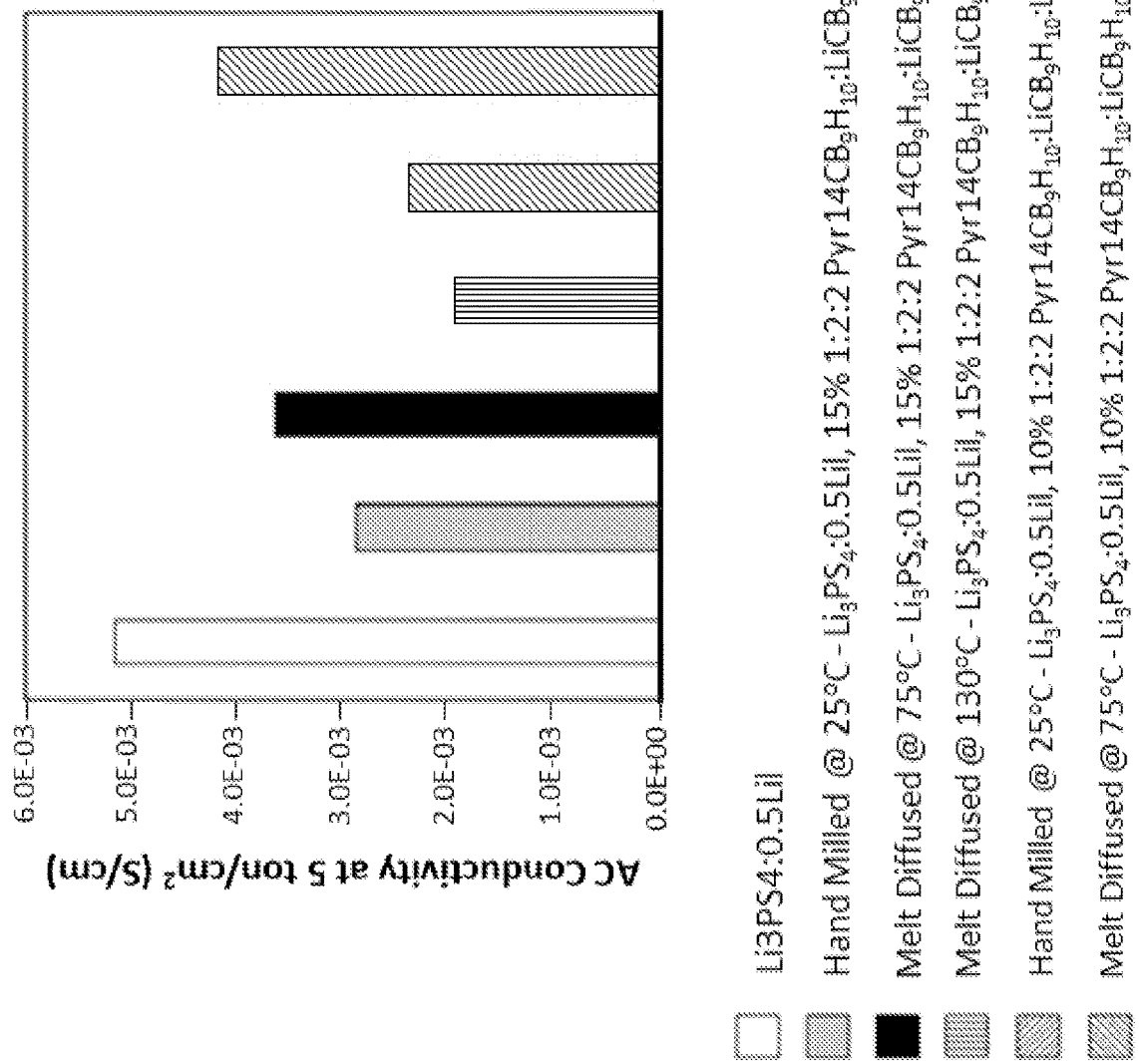

UNIFORM ORGANIC-CERAMIC COMPOSITES INCLUDING A HARD-INORGANIC LITHIUM ION ELECTROLYTE AND A PLURALITY OF SOFT ELECTROLYTES, SOLID-STATE BATTERIES INCLUDING THE SAME, AND METHODS OF PREPARING THE SAME

TECHNICAL FIELD

The present disclosure generally relates to electrochemical cells, more particularly, to solid-state electrolytes for solid-state lithium batteries.

BACKGROUND

Solid-state electrolytes provide many advantages in secondary battery design, including mechanical stability, no volatility, and ease of construction. Typical inorganic solid-state electrolytes having high ionic conductivity are hard materials that can fail due to insufficient contact with the electrode materials after battery cycling. Polymeric and other organic solid-state electrolytes overcome contact failure on cycling because of their "soft" nature. Unfortunately, these electrolytes typically display poor ionic conductivity.

Batteries based on the Li-ion rocking chair mechanism insert $Li^+$ ion into active materials during electrochemical reduction and extract the $Li^+$ ion during electrochemical oxidation. The repeated insertion and extraction of the $Li^+$ ions induce volume changes in the electrolyte and electrode materials. With liquid electrolyte batteries the volume change of the active material has little effect on the capability of the electrolyte to transport $Li^+$ ions over time. However, with solid-state batteries, the solid electrolyte undergoes mechanical stress and physically degrades with the cracking of the solid electrolyte layer. The cracking of the electrolyte leads to battery failure by internal shorting or loss of conductivity of the solid electrolyte.

Solid-state electrolytes that are formed by combining an organic salt with an organic ionic plastic crystal (OIPC) or combining an OIPC or OIPC-like material with an alkaline and/or an alkaline earth salt are materials that exhibit states of coupling intermediate to the extremes displayed by the inorganic electrolytes and the polymeric and organic solid-state electrolytes. The non-flammability, non-volatility, plasticity, and the high electrochemical and thermal stability displayed by these solid-state electrolytes, provide great promise for battery applications. Solid-state electrolytes can be combined with lithium salts for use as lithium ion conductors. In a solvent free synthesis, a typical OIPC-like salt has a melting point above 100° C. and requires melting when mixed with lithium salts, which complicates a device design and increases processing costs. In those instances when these mixtures yield dispersions, which are often non-homogeneous, the batch to batch quality of the electrolyte is negatively affected as well as the battery with such an electrolyte.

Accordingly, the realization of improved lithium ion electrolytes with higher conductivities, stabilities, and process reproducibility for solid-state lithium batteries is desirable.

SUMMARY

Disclosed, in various non-limiting embodiments, are solid-state electrolytes that are not readily damaged over repetitive charge-discharge cycling of a solid-state lithium battery. The improved solid electrolyte material includes a plurality of soft electrolyte (SE) materials, where two or more SE materials are combined with a hard-inorganic lithium ion electrolyte. By employing more than one SE in the solid electrolyte, the stability of the electrolyte and the ease and reproducibility of fabrication is improved.

In various non-limiting embodiments, the solid electrolyte material includes a hard-inorganic electrolyte that can be a lithium thiophosphate (LPS) combined with a SE that can include an organic ionic plastic crystal, such as an OIPC or OIPC-like material. The LPS can be selected from one or more of $Li_3PS_4$, $Li_7P_3S_{11}$, $Li_{10}GeP_2S_{11}$, $xLi_2S \cdot yP_2S_5 \cdot (100-x-y)LiX$ (X=Cl, Br and I), where x and y are mass % values, both x and y ranging from about 33% to about 50% and where x+y is greater than about 75%, or the LPS can be another solid-state lithium electrolyte. The LPS can be prepared as milled combinations of $Li_2S$ and $P_2S_5$ and/or $GeS_2$. The SE can be an organic cation closo-borane anion salt. At least one of the organic cations have flexible and/or asymmetrical substituents attached to a positively charged nitrogen or phosphorus atom and the closo-borane anion can be $CB_{11}H_{12}^-$, $CB_9H_{10}^-$, or $B_{12}H_{12}^{2-}$ or any of the structure $C_yB_{a-y}H_{a-z}X_z^{-(2-y)}$, where: y is 0 or 1; a is 12 when y is 0 and a is 10 or 12 when y is 1; z is 0 to a; and X is independently halogen, alkyl, alkoxy, aryl, alkylaryl, arylalkyl, and/or aryloxy substituents and wherein alkyl groups can be linear, branched, or cyclic, and wherein any substituent can be partially or fully halogenated. The SEs can be combined with a Li salt, such as $LiCB_{11}H_{12}$, $LiCB_9H_{10}$, or any other lithium closo-borate.

In one embodiment, provided herein, a method to prepare the improved solid-state electrolyte involves the combination of a plurality of SE material and the hard-inorganic lithium electrolyte. The organic cation closo-borates salts combined as the SE material can be prepared by salt metathesis or any other method. Combination can occur in the SE synthesis or individual SE can be prepared and subsequently combined. Combination with an included lithium closo-borate can be during or after the synthesis of the SE. Fabrication of the electrolyte layer and the battery is possible at temperatures below 100° C., and below the melting temperature of at least the higher melting SE material used. The LPS is combined with the plurality of SE at a relatively low temperature, less than 100° C., to form a well dispersed and robust solid electrolyte with superior mechanical properties to that of an equivalent solid electrolyte with only one SE included therein.

In one embodiment, provided herein, the solid electrolyte is included in an electrochemical device as a solid electrolyte layer, a solid electrolyte separator, in conjunction with a cathode layer and an anode layer. The cathode can be of any structure used or is useful in a solid-state lithium battery. The anode is an electrode where oxidation occurs during the device's discharge and at which reduction occurs during the device's charge. Similarly, the cathode is an electrode where a cathode material reduction occurs during the device's discharge and a cathode material oxidation occurs during the device's charge.

These and other features of the electrolyte and its preparation will become apparent from the following detailed description when read in conjunction with the figures and examples, which are exemplary, not limiting.

These and other features of the combined solid-state electrolyte, its preparation, and devices including the electrolyte will become apparent from the following detailed description when read in conjunction with the figures and examples, which are exemplary, not limiting.

BRIEF DESCRIPTION OF THE DRAWINGS

For a better understanding of the processes and devices having a solid-state electrolyte including a plurality of SEs, with regard to the particular variations and examples discussed herein, reference is made to the accompanying figures, in which:

FIG. 3A shows composite bar graphs for the conductivities of cells formed as shown in FIG. 2 at 20° C. with various solid-state electrolytes formed with different compositions where all percent and ratio values are molar.

FIG. 3C shows composite bar graphs for the conductivities of cells formed as shown in FIG. 2 at 60° C. with various solid-state electrolytes formed with different compositions, where all percent and ratio values are molar.

Figure 1B:
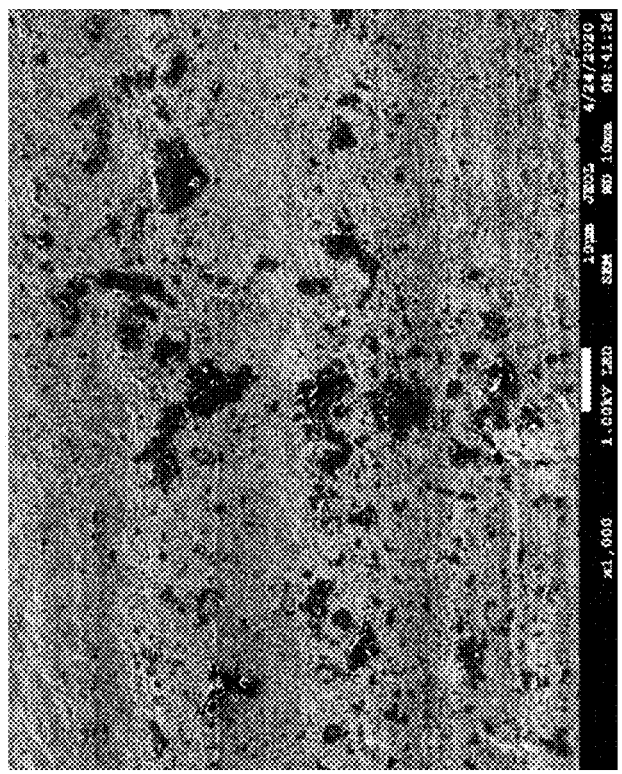
FIGS. 1A and 1B show scanning electron microscopy images of solid state electrolytes prepared from a hard-inorganic electrolyte and a single SE (1A) and solid state electrolytes prepared from a hard-inorganic electrolyte and a plurality of SEs (1B), according to an embodiment, formed under like temperatures and pressures.

It should be noted that the figures set forth herein is intended to exemplify the general characteristics of the methods and devices among those of the present technology, for the purpose of the description of certain aspects. The figure may not precisely reflect the characteristics of any given aspect and are not necessarily intended to define or limit specific embodiments within the scope of this technology.

DETAILED DESCRIPTION

The present disclosure provides a composite for uses as a solid electrolyte for a lithium battery. The solid electrolyte includes a hard-ceramic electrolyte combined with a plurality of SEs. The hard-inorganic electrolyte can be at least one lithium thiophosphate (LPS) selected from the group consisting of $Li_3PS_4$, $Li_7P_3S_{11}$, $Li_{10}GeP_2S_{11}$, and a material of formula (II): $xLi_2S.yP_2S_5.(100-x-y)LiX$ wherein X is I, Cl or Br, each of x and y is a mass % value of from 33% to 50% such that x+y is from 75% to 100% and the total mass % of $Li_2S$, $P_2S_5$ and LiX is 100%. The hard-inorganic electrolyte can be the milled product from $Li_2S$, $P_2S_5$, and, optionally, $GeS_2$. The LPS can be prepared by ball-milling or otherwise milling designed combinations of $Li_2S$, $P_2S_5$ and $GeS_2$. Alternatively, solution or microwave assisted methods can be employed to form the LPS. The solid electrolyte can be other than an LPS, for example NASICON-type Li ion electrolytes, such as $Li_{1.3}Al_{0.3}Ti_{1.7}(PO_4)_3$ (LATP), $Li_{1+x+y}Al_xTi_{2-x}Si_yP_{3-y}O_{12}$, $LiNi_{0.6}Co_{0.2}Mn_{0.2}O_2$, $Li_{0.33}La_{0.55}TiO_3$ (LLTO), $Li_{9.54}Si_{1.74}P_{1.44}S_{11.7}Cl_{0.3}$, and composites of these and other fillers, such as $Li_6ZnNb_4O_{14}$ (LZNO) with an LPS.

The SEs can be a mixture of at least two organic cation closo-borate anion salts and can be combined with at least one lithium closo-borate. The lithium closo-borate can be $LiCB_{11}H_{12}$, $LiCB_9H_{10}$, $Li_2B_{12}H_{12}$, or any of the structure $Li_{(2-y)}C_yB_{a-y}H_{a-z}X_z$, where: y is 0 or 1; a is 12 when y is 0 and a is 10 or 12 when y is 1; z is 0 to a; and X is independently halogen, alkyl, alkoxy, aryl, alkylaryl, arylalkyl, and/or aryloxy substituents and wherein alkyl groups can be linear, branched, or cyclic, and wherein any substituent can be partially or fully halogenated. The plurality of SEs can have at least one organic cation that is an ammonium or phosphonium ion of the structure $[(CR^1R^2)_n]_wZ(R^3)_{4-2w}^+$ where: n is independently 4 to 6; w is 0 to 2; $R^3$ groups are independently $C_1$-$C_8$ alkyl or $C_6$-$C_{14}$ aryl unsubstituted or substituted one or more times with fluorine, alkyl, partially or per-fluorinated alkyl, alkoxy, partially or per-fluorinated alkoxy, phenyl, partially or per-fluorinated phenyl, phenoxy or partially or per-fluorinated phenoxy, and where any alkyl or alkoxy group is linear, branched or cyclic; $R^1$ and $R^2$ groups are independently $C_1$-$C_8$ alkyl, $C_1$-$C_8$ alkoxy, $C_6$-$C_{14}$ aryl, or $C_6$-$C_{14}$ aryloxy, where the carbons are unsubstituted or substituted one or more times with fluorine, alkyl, partially or per-fluorinated alkyl, alkoxy, partially or per-fluorinated alkoxy, phenyl, partially or per-fluorinated phenyl, phenoxy or partially or per-fluorinated phenoxy, and where any alkyl or alkoxy group is linear, branched or cyclic. When w is 0 or 1, the $R^3$ groups can include at least two different structures or when all $R^3$ groups are the same, $R^3$ groups can contain a chiral center but the combined $R^3$'s is racemic. When w is 2, the two $[(CR^1R^2)_n]Z^+$ cyclic structures of the spiro-ammonium or phosphonium ion can be different or when the two $[(CR^1R^2)_n]Z^+$ cyclics are the same, at least one of the $CR^1R^2$ has different $R^1$ and $R^2$ groups and the $R^1$ and $R^2$ groups are randomly situated on both faces of the structure, for example, randomly situated in axial and equatorial position of n=5 cyclic. The Z atom can be, but is not necessarily, a chiral center or any of $R^1$, $R^2$ or $R^3$ groups can be, but is not necessarily, chiral centers. The closo-borate anion of the SEs can be $CB_{11}H_{12}^-$, $CB_9H_{10}^-$, or $B_{12}H_{12}^{2-}$ or any of the structure $C_yB_{a-y}H_{a-z}X_z^{(y-2)-}$, where: y is 0 or 1; a is 12 when y is 0 and a is 10 or 12 when y is 1; z is 0 to a; and X is independently halogen, alkyl, alkoxy, aryl, alkylaryl, arylalkyl, and/or aryloxy substituents and wherein alkyl groups can be linear, branched, or cyclic, and wherein any substituent can be partially or fully halogenated. A plurality of different organic cations can be combined with a closo-borate anion to constitute the plurality of SEs or the plurality of SEs can have one organic cation combined with a plurality of closo-borate anions. A plurality of different organic cations can be combined with a plurality of closo-borate anions to constitute the plurality of SEs. The plurality of SEs can include a mixture of a first SE and at least one second SE. For example, the first SE can be at least 50 mole percent of the plurality of SEs, and at least one second SE can be one or more SEs. Hence, the composition of the electrolyte can be one that is inclusive of many different compositions of SEs.

The present disclosure provides a method to prepare an electrolyte that is a combination of a hard-inorganic electrolyte, such as an LPS, with a plurality of SEs that are organic cation closo-borate anion salts that can be combined with a lithium closo-borate. The LPS and the SE are combined such that the SE is one to 50 mole % of the content in the combined solid electrolyte. The LPS powder is combined with the combined SEs where the SEs are 1 to 50 mole percent of the electrolyte. The LPS can be prepared by ball-milling or otherwise grinding or milling. The SEs are a mixture of a two or more organic cation closo-borate salts. The melting point of the combined SEs being lower than the highest melting SE included in the plurality of SEs. The melting point of the combined SEs can be intermediate of the highest and lowest melting point SEs or the combined SEs can be lower than the lowest melting point SE.

The present disclosure provides for formation of the plurality of organic cation closo-borate salts, the SEs, combined with a lithium closo-borate by physically mixing the two salts, heating to a temperature that is sufficient to melt the mixture at least partially, and further mixing as required, to form the combined SE as a solid upon cooling to 25° C. Another procedure of preparing a plurality of organic cation closo-borate salts combined with lithium closo-borates can be carried out in an organic solvent or mixed organic solvent, such as, an ether, a nitrile, a thioether, an alkane, and/or an amine. In this manner, the SEs can be combined with the lithium closo-borate salt by using the appropriate stoichiometry of lithium closo-borate to ammonium or phosphonium salt followed by removal of the solvent(s). The stoichiometry for formation of the SEs, according to embodiments, can be such that little or no lithium closo-borate is included with one or more SEs. The plurality of SEs and lithium closo-borate dopant can be formed by mixing the various salts to achieve a desired stoichiometry of a desired plurality of SEs that includes a lithium closo-borate. The lithium closo-borate can be up to about 99 mole % of the plurality of SEs.

The present disclosure provides for forming the solid-state electrolyte having a plurality of SEs with the hard-inorganic electrolyte by co-grinding or milling. The solid-state electrolyte, according to an embodiment, can be formed by combining essentially solvent-free solid salts of the hard-inorganic electrolyte and the plurality of SEs and grinding the salts into a homogeneous powder that is subsequently heated to a temperature where the plurality of SEs becomes sufficiently fluid to diffuse into, onto, and among the particulate hard-inorganic electrolyte to form the solid-state electrolytes according to embodiments. The LPS salt can be ground or milled into a micro-powder or nano-powder and mixed with the SEs that are also in the form of a powder. The combined powders can be co-milled, ground, or otherwise mixed and heated to an effective melting point of the plurality of SEs to fluidize the SEs at a temperature of about 100° C. or less. The fluidized SEs coat and diffuse through the entire bulk of the mixture to form a dense composite of the solid-state electrolyte under relatively modest pressures of two tons/cm$^2$ or less, where relative densities are in excess of 80%.

The solid-state electrolyte that includes the hard-inorganic electrolyte with the plurality of SEs can be used as the separator electrolyte in an electrochemical device. The electrochemical device can be a secondary battery or a subunit of a secondary battery. The anode is an electrode where lithium ion oxidation occurs during the device's discharge and at which lithium reduction occurs during the device's charge. Similarly, the cathode is an electrode where a cathode material reduction occurs during the device's discharge and a cathode material oxidation occurs during the device's charge.

The anode can include any material or combination of materials effective to participate in electrochemical oxidation of the lithium during the device's discharge. Similarly, the cathode can include any material or combination of materials effective to participate in electrochemical reduction of the lithium cations and to incorporate reduced lithium metal during a device's charge. In embodiments, the anode can consist essentially of elemental lithium metal or comprise at least one surface layer of elemental lithium metal.

The cathode can comprise any material or combination of materials that undergoes electrochemical insertion of a cathode material during the device's discharge. Similarly, the cathode can include any material or combination of materials for electrochemical extraction of the cathode material during the device's charge. In some variations, the cathode material that is inserted at the cathode during a device discharge and extracted from the cathode during device charging event can comprise the lithium metal.

Figure 1A:
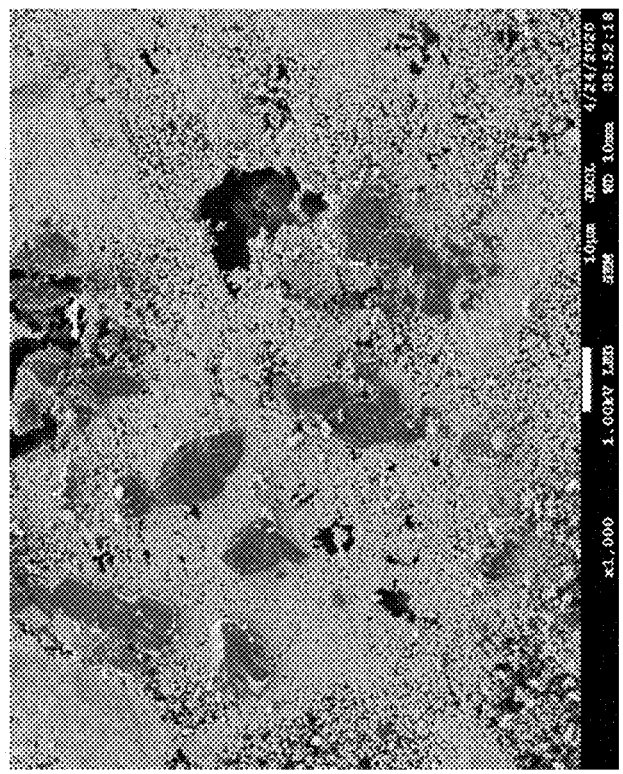

The plurality of SEs with cations of the formula $[(CR^1R^2)_n]_w Z(R^3)_{4-2w}{}^+$, as defined above, can include as one of the plurality of SEs any of the non-limiting cations: N-methyl-N,N-diethyl-N-propylammonium (N1223); N,N-diethyl-N-methyl-N-(2-methoxyethyl)-ammonium (DEME); N,N,N-triethyl-N-hexylammonium (N2226); N-ethyl-N,N-dimethyl-N-butylammonium (N4211); N-methyl-N-propylpyrrolidinium (Pyr13); N-methyl-N-propylpiperidinium (Pip13); N-methyl-N-(2-methoxyethyl)-pyrrolidinium (Pyr12o1); N-methyl-N-ethylpyrrolidinium (Pyr12); N-methyl-N-butylpyrrolidinium (Pyr14); methyltriethylphosphonium (P1222); methyltributylphosphonium (P1444); triethylhexylphosphonium (P2226); and trimethylisopropylphosphonium (P111$_i$4). The SEs can displays some asymmetry and may exist as a racemate, however, the combination of two SEs form a well-mixed material that acts as an amorphous-like solid and allows for rotational and conformational freedoms that are often absent in individual more crystalline SEs. The favorable homogeneous distribution provided by the inclusion of two SEs over that where a single SE is employed is illustrated in FIGS. 1A-1D. The Scanning electron microscopy image (SEM) of an electrolyte composite from a single SE with an LPS is shown in FIG. 1A and that of a pair of SEs, according to an embodiment, is shown in FIG. 1B. The distribution of the SE(s) within the hard-inorganic electrolyte of the solid-state electrolyte is indicated by the energy dispersive x-ray spectroscopy (EDS) maps in FIGS. 1C and 1D for the composites using a single SE and mixture of two SEs, respectively, that clearly shows a greater homogeneity of the solid-state electrolyte formed from the plurality of SEs relative to that of the single SE. The bright portion of the EDS indicates the distribution of the boron content.

Figure 2:
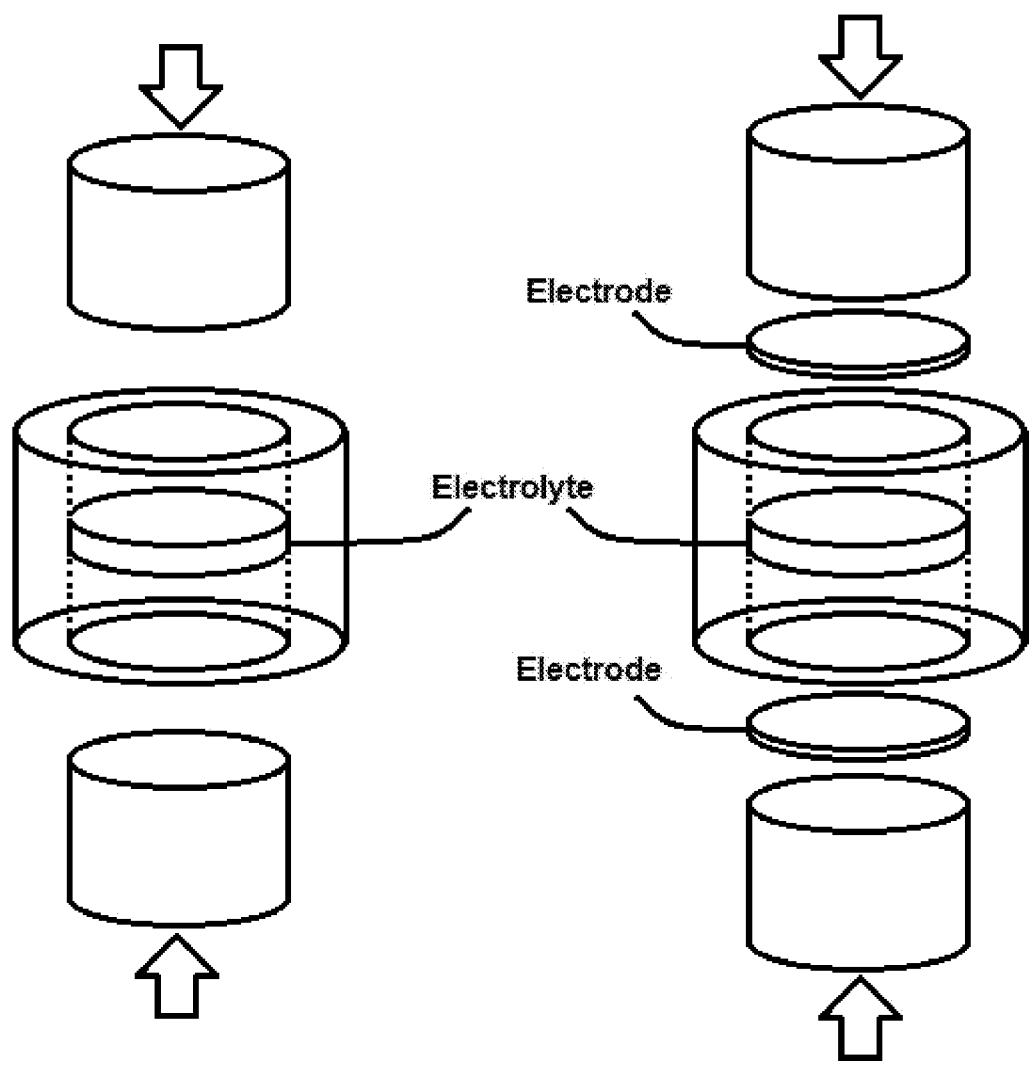
FIG. 2 shows a pair of drawings for the forming of test cells having the solid-state electrolyte between electrodes by pressing the electrolyte and subsequently pressing with slip in electrodes.
Figure 3B:
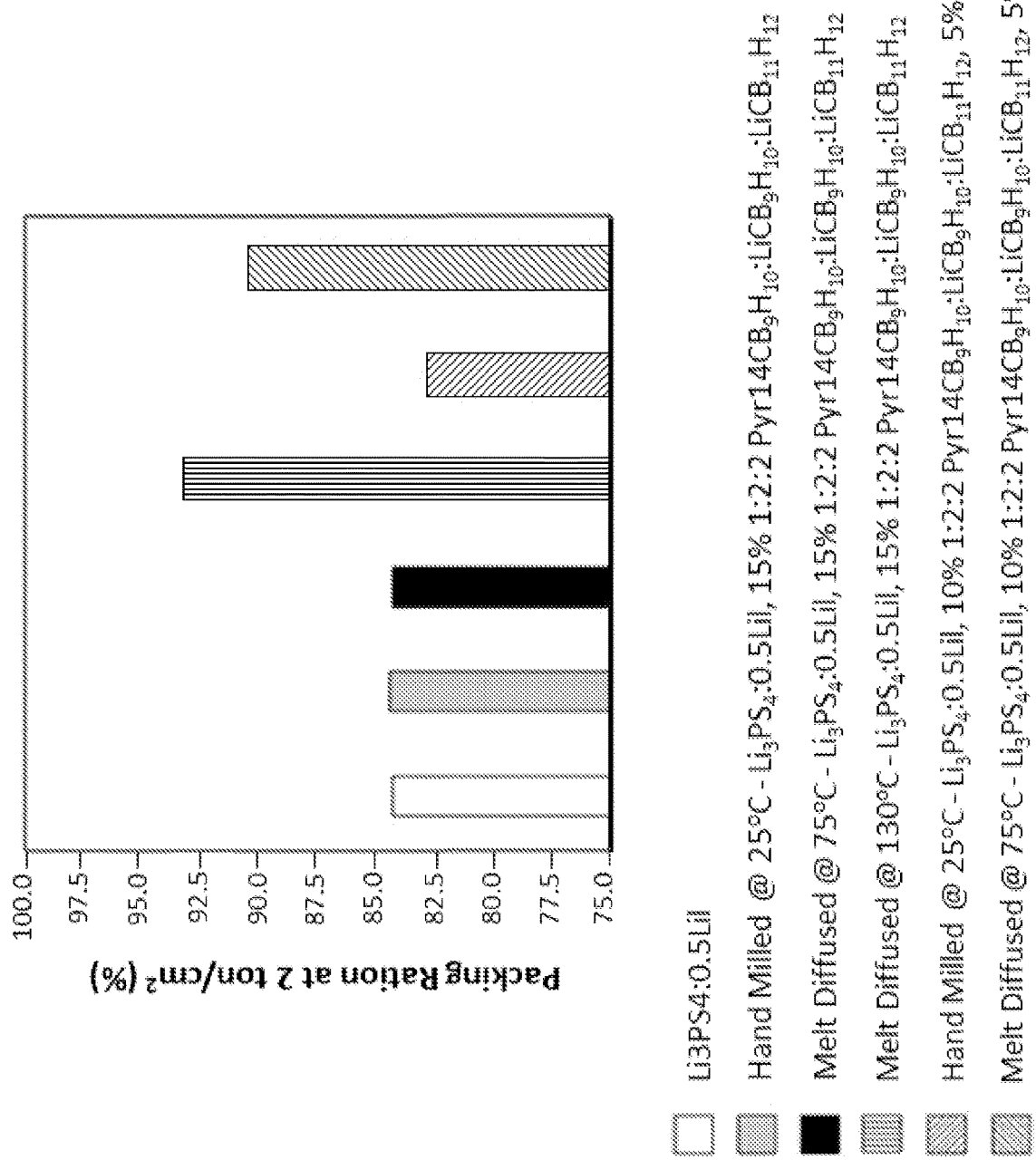
FIG. 3B shows composite bar graphs for the relative densities, or packing ratio, of cells formed as shown in FIG. 2 at 20° C. with various solid-state electrolytes formed with different compositions where all percent and ratio values are molar.
Figure 3D:
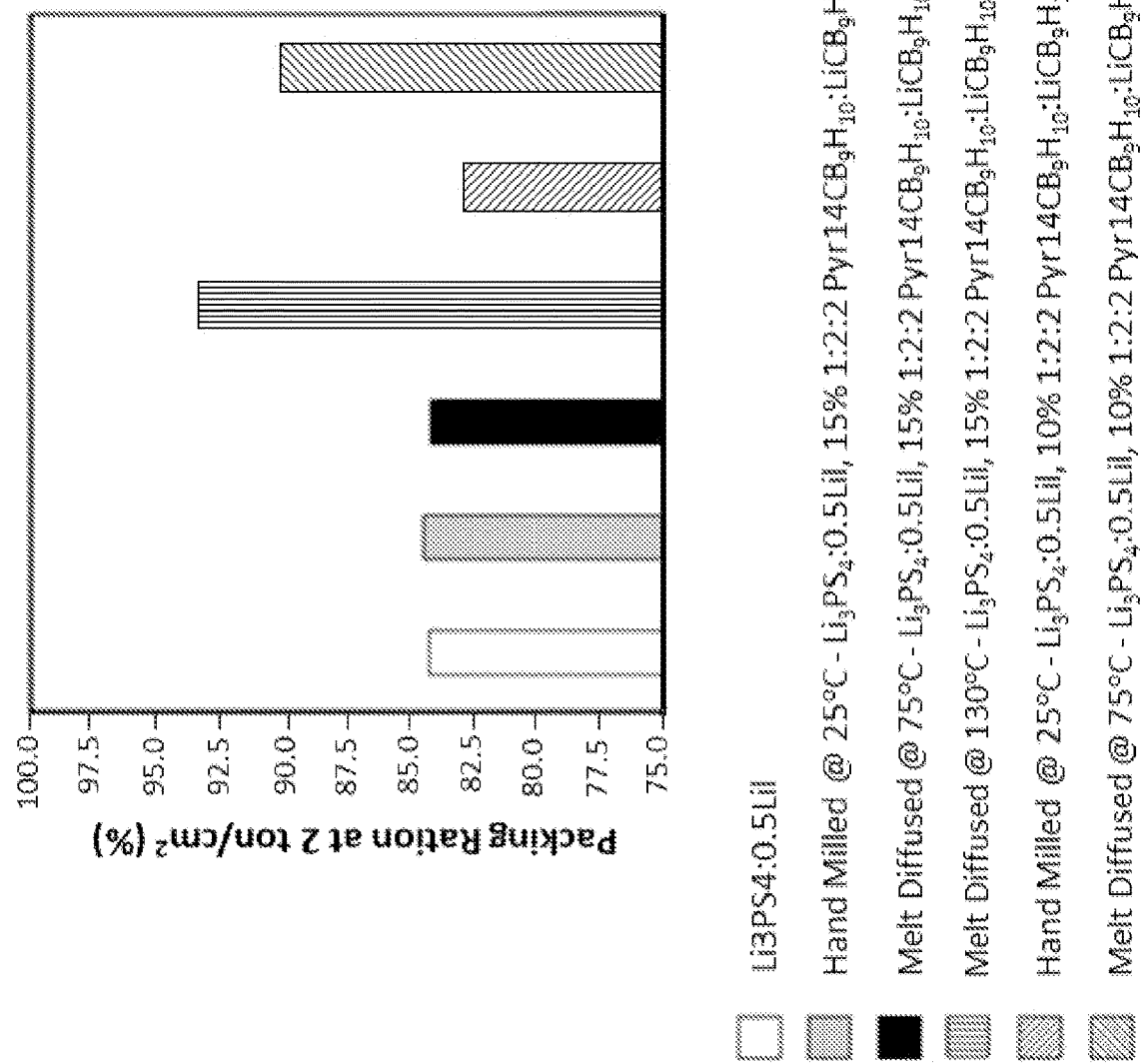
FIG. 3D shows composite bar graphs for the relative densities, or packing ratios, of cells formed as shown in FIG. 2 at 60° C. with various solid-state electrolytes formed with different compositions, where all percent and ratio values are molar.
Figure 4A:
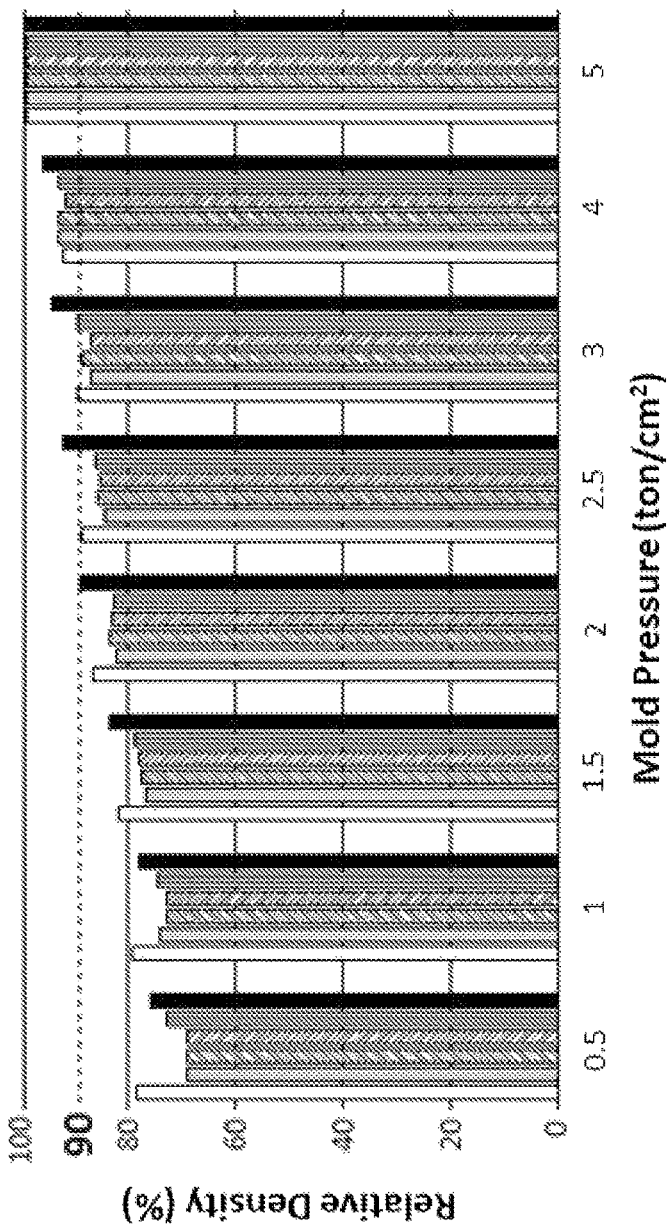
FIG. 4A shows bar graphs for the relative densities of cells formed as shown in FIG. 2 for various solid-state electrolytes formed with a single SE and a plurality of SEs formed at various temperatures and when pressed at various pressures.
Figure 4B:
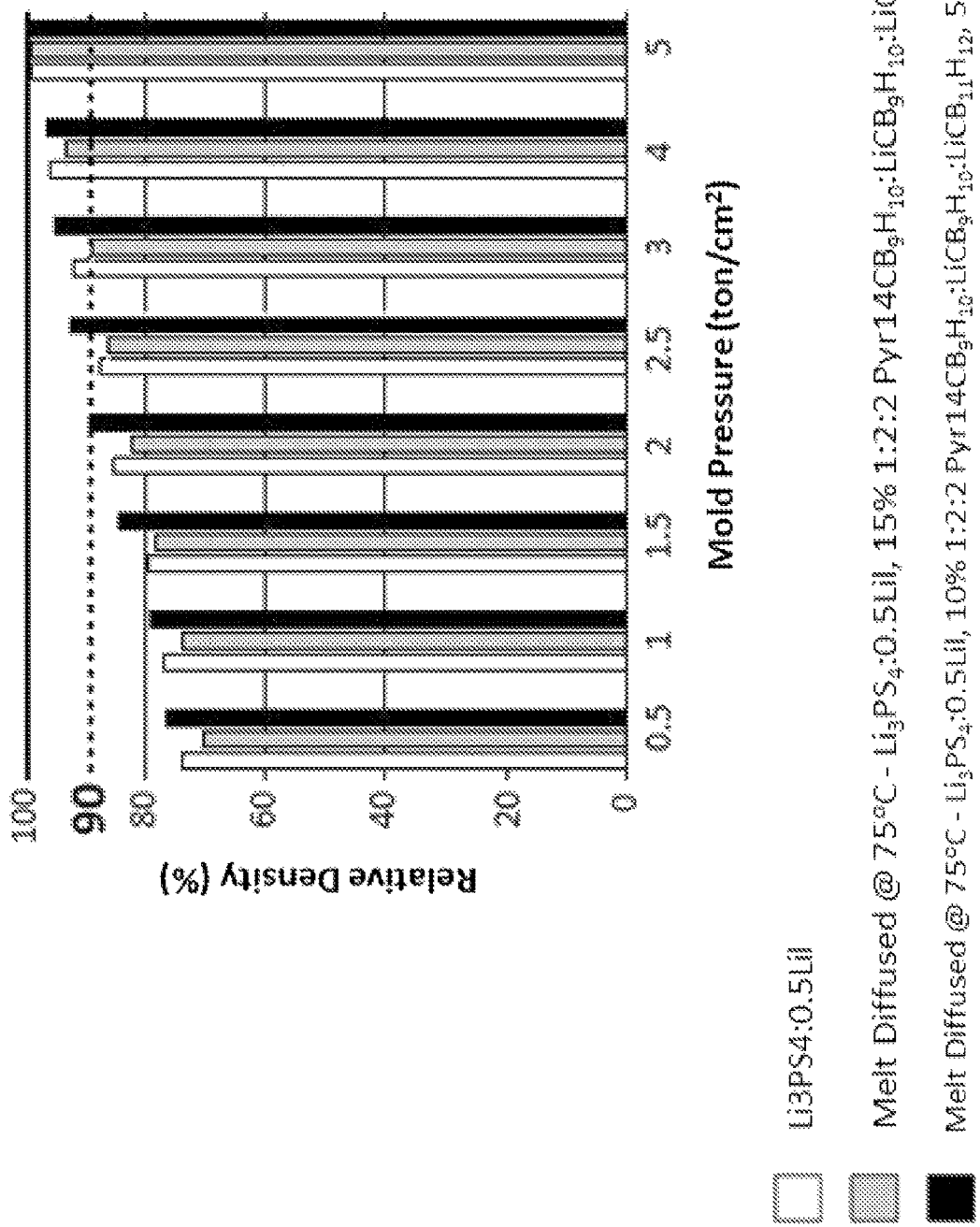
FIG. 4B shows bar graphs for the relative densities of cells formed as shown in FIG. 2 for various solid-state electrolytes formed with, no SE, a single SE, and a plurality of SEs, according to an embodiment, formed at 75° C. when pressed at various pressures.

In addition, cells were prepared using the composite electrolytes of FIGS. 1A-1B for the measurement of AC conductivity. Cell preparation is indicated in the drawings of FIG. 2, which illustrates the sequential formation of the separator electrolyte layer and its pressing with the electrodes to form a cell in two steps. AC conductivities for cell employing $Li_3PS_4$:0.5LiI a single SE, $Pyr_{14}CB_9H_{10}$ with $LiCB_9H_{10}$ and $LiCB_{11}H_{12}$ at a 1:2:2 molar ratio and a mixture of two SEs (15 mol % total) $P_{2226}CB_{11}H_{12}$ with $LiCB_{11}H_{12}$ at a 2:1 molar ratio (5 mol %) and $Pyr_{14}CB_9H_{10}$ with $LiCB_9H_{10}$, and $LiCB_{11}H_{12}$ at a 1:2:2 molar ratio (10 mol %) are shown at 20 and 60° C. in FIGS. 3A through 3D. The volume percent of SE was higher for the mixed SEs, yet, at 60° C. the AC conductivity was superior for cells with that separator having a plurality of SEs than that of the single SE that has a higher melting temperature. The use of a plurality of SEs as a soft material allows use of a lower pressure to achieve a solid-state electrolyte layer with a high relative density: example, greater than 90%. As can be seen in FIG. 4A, the relative density of the solid-state electrolyte is greatest, as in achieves higher relative density than other examples at lower molding pressures, for the electrolyte that has a plurality of SEs than does that of a single SE, where the synthesis is carried out at temperatures below that of the single SE's melting point of about 130° C., allowing the separator layer to be formed at low molding pressures. At modest pressures, in excess of 1 ton/cm², the electrolyte with a plurality of SEs achieves a higher relative density at low temperatures than does the electrolyte with a single SE and achieves a relative density in excess of 90% at 2 tons/cm². As shown in FIG. 4B, the use of the plurality of SEs allows a relative density that is greater than that of the SE free electrolyte. At the synthesis temperature that is lower than the melting point of the single SE, the relative density of the electrolyte with a single SE cannot achieve the relative density of the SE free electrolyte. When synthesized at a low temperature, 75° C., and a low pressure, 2 tons/cm², the electrolyte with the plurality of SEs achieves a relative density in excess of 90%.

Various aspects of the present disclosure are further illustrated with respect to the following Examples. It is to be understood that these Examples are provided to illustrate specific embodiments of the present disclosure and should not be construed as limiting the scope of the present disclosure in or to any particular aspect.

Example 1

Synthesis of an LPS: Anhydrous $Li_2S$ (Aldrich, 99.98%) and anhydrous $P_2S_5$ (Sigma-Aldrich, 99%) were used to form a mixture (2.0 g total) containing a molar ratio of $Li_2S$:$P_2S_5$ of 3:1. This mixture was ground by hand for 5 minutes and transferred to a 45 mL $ZrO_2$ ball-mill pot along with 32 g of 5 mm diameter $ZrO_2$ balls. The mixture was ball-milled for 40 hours using a planetary ball mill (Pulverisette 7, Fritsch). The yellow ($Li_3PS_4$) powder was collected. An amorphous phase, and completion of reaction was confirmed by a lack of $Li_2S$ crystalline peaks, by powder X-ray diffraction.

Synthesis of $Li_3PS_4$:0.5LiI Electrolyte: Anhydrous LiI beads (Aldrich, 99.999%) were added to an agate mortar and pulverized. Then, LiI was transferred to a second mortar with anhydrous $Li_2S$ and anhydrous $P_2S_5$ to form 2.0 g of a mixture at molar ratio of $Li_2S$:$P_2S_5$:LiI of 3:1:1. The mixture was ground for five minutes and transferred to a 45 mL $ZrO_2$ ball-mill pot along with 32 g of 5 mm diameter $ZrO_2$ balls. The mixture was ball-milled for 40 hours using a planetary ball mill (Pulverisette 7, Fritsch). Each cycle consisted of spinning the pot for 1 h at 550 rpm and then resting the pot for 5 min. The amorphous $Li_3PS_4$.0.5LiI (light yellow) powder was collected. An amorphous phase and completion of reaction was confirmed by a lack of $Li_2S$ crystalline peaks in powder X-ray diffraction.

Example 2

Preparation of Composites of LPS-SEs: In one example, $Pyr_{14}CB_9H_{10}$ mixed with both $LiCB_9H_{10}$, and $LiCB_{11}H_{12}$ at a 1:2:2 molar ratio (15 mol. % total) was combined with LPS as the balance. In another example, $P_{2226}CB_{11}H_{12}$ mixed with $LiCB_{11}H_{12}$ at a 2:1 molar ratio (5 mol. % total) was combined with $Pyr_{14}CB_9H_{10}$ mixed with both $LiCB_9H_{10}$, and $LiCB_{11}H_{12}$ at a 1:2:2 molar ratio (10 mol. % total), resulting in a final 15 mol % mixture, with the balance being LPS. For each example, the powders were first combined in a mortar and ground with a pestle. A hand milling (continued mixing by mortar/pestle) or melt diffusion process was carried out on a portion of the resulting mixture by heating to melt the soft electrolyte at a set temperature (varied between 25-130° C.). The addition of $P_{2226}CB_{11}H_{12}$ mixed with $LiCB_{11}H_{12}$ at a 2:1 molar ratio (5 mol. % total) results in the lowering of the melt diffusion temperature used to make the final SE composite.

Example 3

Figure 1D:
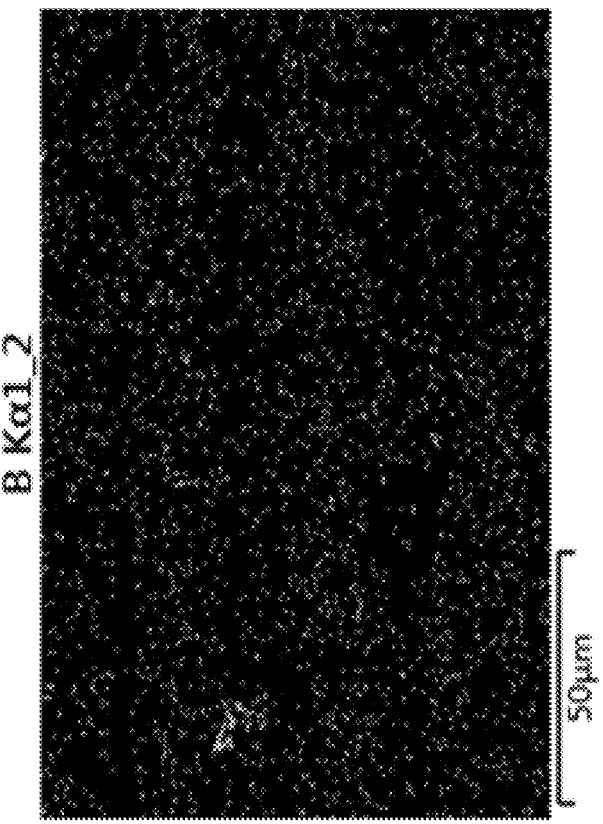
FIGS. 1C and 1D show the energy dispersive x-ray spectroscopy (EDS) maps of the solid state electrolytes prepared from a hard-inorganic electrolyte and a single SE (1A) and the solid state electrolytes prepared from a hard-inorganic electrolyte and a plurality of SEs (1B), respectively, where the signal from boron is not dispersed homogeneously in 1C, but very homogeneously dispersed in 1D for the solid state electrolytes prepared from a hard-inorganic electrolyte and a plurality of SEs, according to an embodiment.
Figure 1C:
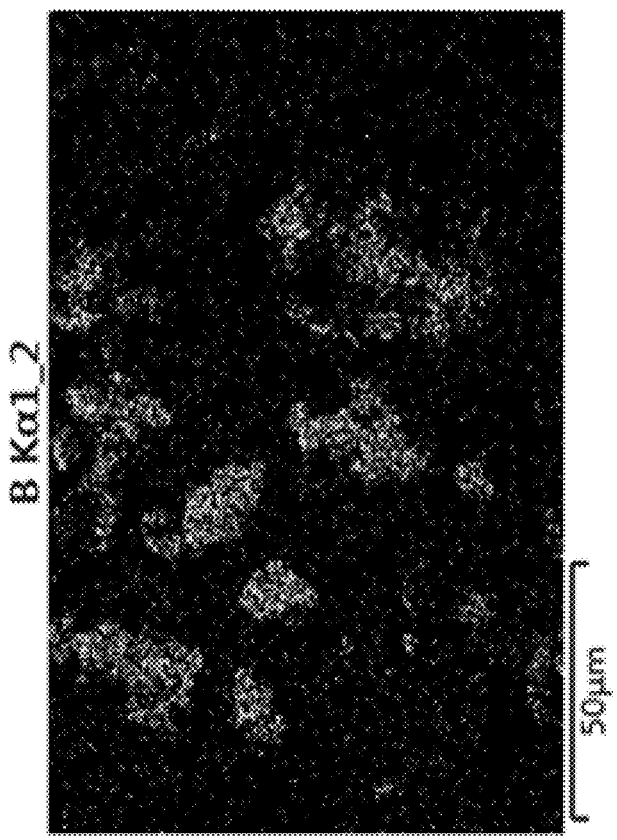

Aliquots of 80 to 300 mg of an LPS or an LPS-SE composites were cold-pressed into 1.128 cm diameter pellets using 1 to 6 tons/cm² of pressure. Conductivity measurements at low molding pressures, for example 2 ton/cm², for the plurality of SEs composite solid-state electrolytes, indicates better packing density than hard ceramic solid electrolytes alone. Conductivity measurements were performed using an electrochemical impedance spectroscopy and using blocking electrodes. EDS spectroscopy, as shown in FIGS. 1C and 1D for single SE and two SEs, respectively, indicates a uniform distribution of boron throughout the separator layer, implying a high homogeneity of the LPS and SE content of the composite.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. A solid-state electrolyte, comprising a combination of:
    an inorganic electrolyte comprising lithium ion; and
    a mixture of a plurality of organic cation closo-borate anion salts melt diffused and homogenously dispersed with particles of the inorganic electrolyte, wherein the mixture of the plurality of organic cation closo-borate anion salts has a melting temperature lower than a melting point of a highest melting point organic cation closo-borate anion salt included in the plurality of organic cation closo-borate anion salts.

2. The solid-state electrolyte according to claim 1, wherein the solid-state electrolyte has a relative density of at least 80%.

3. The solid-state electrolyte according to claim 1, wherein the plurality of organic cation closo-borate anion salts comprises two or more organic cation closo-borate anion salts selected from:
    an ammonium or phosphonium ion of the structure:
    $[(CR^1R^2)_n]_w Z(R^3)_{4-2w}{}^+$
    where:
        Z is nitrogen (N) or phosphorous (P);
        n is independently 4 to 6;
        w is 0 to 2;
        $R^3$ groups are independently $C_1$-$C_8$ alkyl or $C_6$-$C_{14}$ aryl and is unsubstituted or substituted one or more times with fluorine, alkyl, partially or perfluorinated alkyl, alkoxy, partially or per-fluorinated alkoxy, phenyl, partially or per-fluorinated phenyl, phenoxy or partially or per-fluorinated phenoxy, and where any alkyl or alkoxy group is linear, branched or cyclic; and
        $R^1$ and $R^2$ groups are independently hydrogen, $C_1$-$C_8$ alkyl, $C_1$-$C_8$ alkoxy, $C_6$-$C_{14}$ aryl, or $C_6$-$C_{14}$ aryloxy and are unsubstituted or substituted one or more times with fluorine, alkyl, partially or per-fluorinated alkyl, alkoxy, partially or per-fluorinated alkoxy, phenyl, partially or per-fluorinated phenyl, phenoxy or partially or per-fluorinated phenoxy, and where any alkyl or alkoxy group is linear, branched or cyclic; and
    a closo-borane anion selected from $CB_{11}H_{12}{}^-$, $CB_9H_{10}{}^-$, $B_{12}H_{12}{}^{2-}$, or
    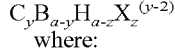
        where:
            y is 0 or 1;
            a is 12 when y is 0 and a is 10 or 12 when y is 1;
            z is 0 to a; and
            X is independently halogen, alkyl, alkoxy, aryl, alkylaryl, arylalkyl, and/or aryloxy substituents and wherein alkyl groups can be linear, branched, or cyclic, and wherein any substituent can be partially or fully fluorinated, or any combination thereof.

4. The solid-state electrolyte according to claim 1, wherein the plurality of organic cation closo-borate anion salts comprises 5 to 70 mole % of the combination.

5. The solid-state electrolyte according to claim 1, wherein the plurality of organic cation closo-borate anion salts is a mixture of a first organic cation closo-borate anion salt and at least one second organic cation closo-borate anion salt, wherein the first organic cation closo-borate anion salt is at least 50 mole % of the plurality of organic cation closo-borate anion salts.

6. The solid-state electrolyte according to claim 1, wherein the plurality of organic cation closo-borate anion salts comprise at least one of: N-methyl-N,N-diethyl-N-propylammonium (N1223); N,N-diethyl-N-methyl-N-(2-methoxyethyl)-ammonium (DEME); N,N,N-triethyl-N-hexylammonium (N2226); N-ethyl-N,N-dimethyl-N-butylammonium (N4211); 1-methyl-1-propylpyrrolidinium (Pyr13); N-methyl-N-propylpiperidinium (Pip13); N-methyl-N-(2-methoxyethyl)-pyrrolidinium (Pyr12o1); N-methyl-N-ethylpyrrolidinium (Pyr12); N-methyl-N-butylpyrrolidinium (Pyr14); methyltriethylphosphonium (P1222); methyltributylphosphonium (P1444); triethylhexylphosphonium (P2226); and trimethylisopropylphosphonium (P111$_i$4).

7. The solid-state electrolyte according to claim 1 further comprising a lithium closo-borate combined with the plurality of organic closo-borate anion salts, the lithium closo-borate having the structure $LiCB_{11}H_{12}$, $LiCB_9H_{10}$, $Li_2B_{12}H_{12}$, or 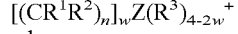
    where:
        y is 0 or 1;
        a is 12 when y is 0 and a is 10 or 12 when y is 1;
        z is 0 to a; and
        X is independently halogen, alkyl, alkoxy, aryl, alkylaryl, arylalkyl, and/or aryloxy substituents and wherein alkyl groups can be linear, branched, or cyclic, and wherein any substituent can be partially or fully fluorinated, or any combination thereof.

8. The solid-state electrolyte according to claim 1, wherein the inorganic electrolyte comprises:
    at least one lithium thiophosphate (LPS) selected from the group comprising $Li_3PS_4$, $Li_7P_3S_{11}$, $Li_{10}GeP_2S_{11}$, and $xLi_2S.yP_2S_5.(100-x-y)LiX$, wherein X is I, Cl or Br, x and y are mass % of about 33% to about 50%, and x+y is about 75% to 100%; and/or at least one NASICON-type Li ion electrolyte.

9. The solid-state electrolyte according to claim 8, wherein the NASICON-type Li ion electrolyte comprises $Li_{1.3}Al_{0.3}Ti_{1.7}(PO_4)_3$ (LATP), $LiNi_{0.6}Co_{0.2}Mn_{0.2}O_2$, $Li_{0.33}La_{0.55}TiO_3$ (LLTO), $Li_{9.54}Si_{1.74}P_{1.44}S_{11.7}Cl_{0.3}$, or any combination thereof.

10. A lithium battery, comprising:
an anode; a cathode; and a separator comprising a solid-state electrolyte, wherein the solid-state electrolyte comprises a combination of:
an inorganic electrolyte comprising lithium ion; and
a mixture of a plurality of organic cation closo-borate anion salts melt diffused and homogenously dispersed with particles of the inorganic electrolyte, wherein the mixture of the plurality of organic cation closo-borate anion salts has a melting temperature lower than a melting point of a highest melting point organic cation closo-borate anion salt included in the plurality of organic cation closo-borate anion salts.

11. The lithium battery according to claim 10, wherein the separator is a separator layer disposed between the anode and the cathode.

12. The lithium battery according to claim 10, wherein the solid-state electrolyte has a relative density of at least 90%.

13. The lithium battery according to claim 10, wherein the plurality of organic cation closo-borate anion salts comprise two or more compounds where each of the compounds comprise:
an ammonium or phosphonium ion of the structure:
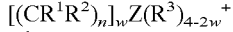
where:
Z is nitrogen (N) or phosphorous (P);
n is independently 4 to 6;
w is 0 to 2;
$R^3$ groups are independently $C_1$-$C_8$ alkyl or $C_6$-$C_{14}$ aryl and is unsubstituted or substituted one or more times with fluorine, alkyl, monofluorinated to perfluorinated alkyl, alkoxy, monofluorinated to perfluorinated alkoxy, phenyl, monofluorinated to perfluorinated phenyl, phenoxy or monofluorinated to perfluorinated phenoxy, and where any alkyl or alkoxy group is linear, branched or cyclic; and
$R^1$ and $R^2$ groups are independently hydrogen, $C_1$-$C_8$ alkyl, $C_1$-$C_8$ alkoxy, $C_6$-$C_{14}$ aryl, or $C_6$-$C_{14}$ aryloxy and are unsubstituted or substituted one or more times with fluorine, alkyl, monofluorinated to perfluorinated alkyl, alkoxy, monofluorinated to perfluorinated alkoxy, phenyl, monofluorinated to perfluorinated phenyl, phenoxy or monofluorinated to perfluorinated phenoxy, and where any alkyl or alkoxy group is linear, branched or cyclic; and
a closo-borane anion selected from $CB_{11}H_{12}^-$, $CB_9H_{10}^-$, $B_{12}H_{12}^{2-}$, or $C_yB_{a-y}H_{a-z}X_z^{(y-2)}$
where:
y is 0 or 1;
a is 12 when y is 0 and a is 10 or 12 when y is 1;
z is 0 to a; and
X is independently halogen, alkyl, alkoxy, aryl, alkylaryl, arylalkyl, and/or aryloxy substituents and wherein alkyl groups can be linear, branched, or cyclic, and wherein any substituent can be partially or fully halogenated, or any combination thereof.

14. The lithium battery according to claim 10, wherein the plurality of organic cation closo-borate anion salts comprises a mixture of a first organic cation closo-borate anion salt and at least one second organic cation closo-borate anion salt, wherein the first organic cation closo-borate anion salt is at least 50 mole % of the plurality of organic cation closo-borate anion salts and comprises:
about 20 to about 80 weight % silicon;
about 5 to about 30 weight % carbon; and
about 20 to about 50 weight % of the solid electrolyte.

15. The lithium battery according to claim 10 further comprising a lithium closo-borate combined with the plurality of organic closo-borate anion salts, the lithium closo-borate having the structure $LiCB_{11}H_{12}$, $LiCB_9H_{10}$, $Li_2B_{12}H_{12}$, or $Li_{(2-y)}(C_yB_{a-y}H_{a-z}X_z)$
where:
y is 0 or 1;
a is 12 when y is 0 and a is 10 or 12 when y is 1;
z is 0 to a; and
X is independently halogen, alkyl, alkoxy, aryl, alkylaryl, arylalkyl, and/or aryloxy substituents and wherein alkyl groups can be linear, branched, or cyclic, and wherein any substituent can be partially or fully halogenated, or any combination thereof.

16. The lithium battery according to claim 10, wherein the inorganic electrolyte comprises:
at least one lithium thiophosphate (LPS) selected from the group comprising $Li_3PS_4$, $Li_7P_3S_{11}$, $Li_{10}GeP_2S_{11}$, and $xLi_2S.yP_2S_5.(100-x-y)LiX$, wherein X is I, Cl or Br, x and y are mass % of about 33.3% to about 50%, and x+y is about 75% to 100%; and/or at least one NASICON-type Li ion electrolyte.

17. The lithium battery according to claim 16, wherein the NASICON-type Li ion electrolyte comprises $Li_{1.3}Al_{0.3}Ti_{1.7}(PO_4)_3$ (LATP), $LiNi_{0.6}Co_{0.2}Mn_{0.2}O_2$, $Li_{0.33}La_{0.55}TiO_3$ (LLTO), $Li_{9.54}Si_{1.74}P_{1.44}S_{11.7}Cl_{0.3}$, or any combination thereof.

* * * * *